United States Patent
Pilon (10) Patent No.: US 8,443,931 B2
(45) Date of Patent: May 21, 2013

(54) NOISE REDUCTION OF SUPERSONIC JET ENGINES

(75) Inventor: Anthony R. Pilon, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/081,301

(22) Filed: Apr. 6, 2011

(65) Prior Publication Data

US 2012/0255806 A1    Oct. 11, 2012

(51) Int. Cl.
*F02K 1/12* (2006.01)

(52) U.S. Cl.
USPC .......................................... 181/215; 181/219

(58) Field of Classification Search
USPC ............ 181/215, 216, 219; 244/1 N; 415/119
See application file for complete search history.

(56) References Cited

U.S. PATENT DOCUMENTS

| | | | |
|---|---|---|---|
| 2,931,169 A | | 4/1960 | Glenn |
| 2,938,335 A | | 5/1960 | Cook et al. |
| 3,367,579 A | * | 2/1968 | Mehr ........................ 239/265.41 |
| 3,386,658 A | * | 6/1968 | Mehr ........................... 239/127.3 |
| 3,443,757 A | | 5/1969 | Townend |
| 3,515,361 A | | 6/1970 | Blackburn |
| 3,650,348 A | | 3/1972 | Colebrook et al. |
| 3,664,455 A | | 5/1972 | Duvvuri |
| 3,730,460 A | | 5/1973 | Mederer |
| 3,799,446 A | | 3/1974 | Rado |
| 3,807,637 A | * | 4/1974 | Camboulives et al. .. 239/265.41 |
| 3,814,325 A | | 6/1974 | McCardle, Jr. et al. |
| 4,075,833 A | | 2/1978 | Sargisson |
| 4,249,628 A | | 2/1981 | Longley |
| 4,291,782 A | | 9/1981 | Klees |
| 4,422,524 A | | 12/1983 | Osborn |
| 4,898,343 A | | 2/1990 | Kamo |
| 5,082,182 A | | 1/1992 | Bruchez, Jr. et al. |
| 5,110,050 A | | 5/1992 | Nightingale |
| 5,431,344 A | | 7/1995 | Novotny et al. |
| 5,520,336 A | * | 5/1996 | Jourdain et al. ......... 239/265.39 |
| 5,806,302 A | | 9/1998 | Cariola et al. |
| 5,826,794 A | | 10/1998 | Rudolph |
| 6,376,820 B1 | | 4/2002 | Butterfield et al. |

(Continued)

FOREIGN PATENT DOCUMENTS

| | | |
|---|---|---|
| GB | 1385260 | 2/1975 |
| GB | 1435946 | 5/1976 |

OTHER PUBLICATIONS

Bowers, et al., "Multiaxis Thrust Vectoring Using Axisymmetric Nozzles and Postexit Vanes on an F/A-18 Configuration Vehicle," NASA Technical Memorandum 101741, Apr. 1991.

*Primary Examiner* — Jeremy Luks
(74) *Attorney, Agent, or Firm* — McDermott Will & Emery LLP (57) ABSTRACT

A jet engine adapted for reducing far-field noise levels is disclosed. The jet engine has a plurality of flap assemblies that are disposed around a perimeter of an exhaust port of the jet engine. Each flap assembly is movable between a first position and a second position. The jet engine also includes a plurality of actuators respectively coupled to the plurality of flap assemblies. Each actuator is configured to selectively move the coupled flap assembly between the first and second positions. The jet engine also includes a controller that is coupled to each actuator. The controller is configured to cause at least one actuator to move the coupled flap assembly between the first and second positions at a determined frequency.

13 Claims, 4 Drawing Sheets

U.S. PATENT DOCUMENTS

| | | | |
|---|---|---|---|
| 6,385,965 B1 | 5/2002 | Abbe et al. | |
| 6,705,547 B2 | 3/2004 | Braga et al. | |
| 6,718,752 B2 | 4/2004 | Nesbitt et al. | |
| 6,751,944 B2* | 6/2004 | Lair | 60/226.3 |
| 6,813,877 B2 | 11/2004 | Birch et al. | |
| 6,845,607 B2 | 1/2005 | Lair | |
| 7,010,905 B2* | 3/2006 | Lair | 60/226.1 |
| 7,085,388 B2 | 8/2006 | Butler et al. | |
| 7,308,966 B2 | 12/2007 | Gupta | |
| 7,481,290 B2 | 1/2009 | Pendzich | |
| 7,793,504 B2 | 9/2010 | Baker et al. | |
| 2006/0150612 A1* | 7/2006 | Anderson et al. | 60/204 |
| 2007/0039328 A1* | 2/2007 | Petty et al. | 60/771 |
| 2007/0256419 A1* | 11/2007 | Baker et al. | 60/771 |
| 2009/0064660 A1 | 3/2009 | Toffan et al. | |
| 2009/0230212 A1 | 9/2009 | Barr et al. | |
| 2009/0297338 A1 | 12/2009 | Lord et al. | |
| 2010/0126139 A1 | 5/2010 | Howe | |

* cited by examiner

NOISE REDUCTION OF SUPERSONIC JET ENGINES

STATEMENT REGARDING FEDERALLY SPONSORED RESEARCH OR DEVELOPMENT

Not applicable.

BACKGROUND

1. Field

The present disclosure generally relates to systems and methods of reducing the exhaust noise from a jet engine and, in particular, reducing the noise using high frequency actuation of the exhaust nozzle vanes.

2. Description of the Related Art

Figure 1:
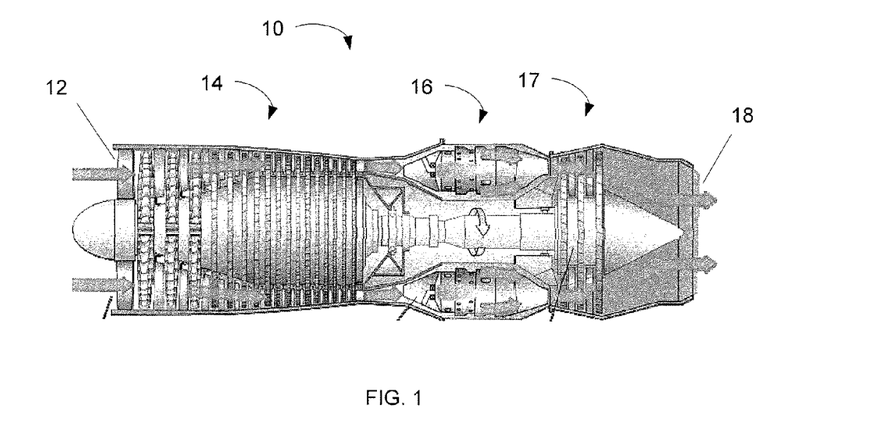
FIG. 1 is a cut-away diagram of an example low-bypass jet engine.
Figure 2:
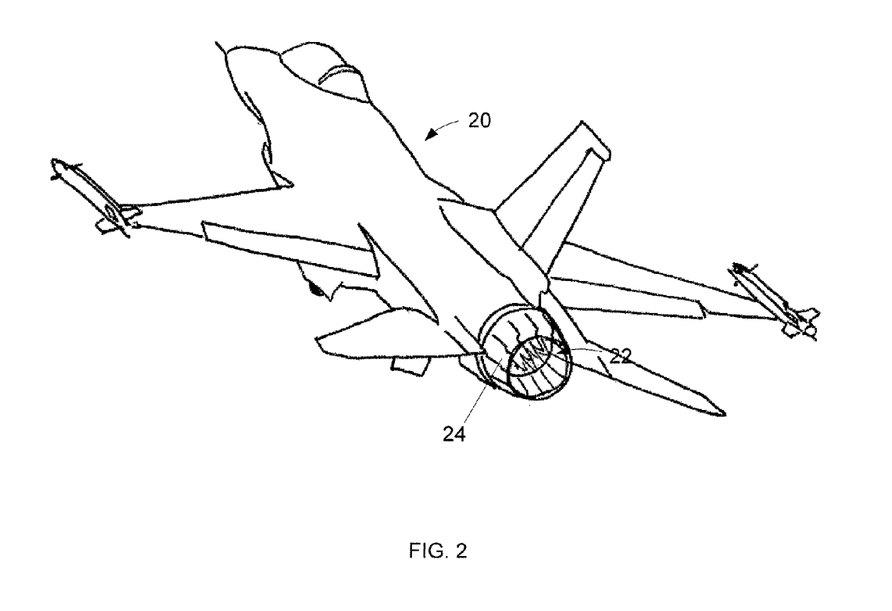
FIG. 2 depicts an example jet aircraft with a variable geometry exhaust nozzle.

High-performance fighter aircraft are powered with low-bypass-ratio turbofan or "jet" engines such as shown in FIG. 1 and variable-geometry nozzles as seen in FIG. 2. The jet flows which emanate from these nozzles are supersonic (at high power settings) and, at most conditions, over-expanded (i.e. the static pressure at the nozzle exit is lower than ambient static pressure).

The noise emitted by high performance jet engines is due to the turbulent mixing of air in the supersonic exhaust jet, as well as unsteady motion of shock waves, and shock wave-turbulence interaction. Reduction of jet noise in the past has been achieved via enhancement of mixing in the jet shear layer through the use of chevrons, tabs, fluidic injection, etc. This increases the noise in the immediate near field, but also increases the frequency of the radiated noise. Since the atmosphere absorbs high frequency sound much more rapidly than low frequencies, the mixing enhancement results in lower noise in the far field. However, chevrons, tabs, etc. generally cause additional drag on the aircraft and increase the weight and complexity of the nozzle. Thus, these devices are not generally employed on high-performance military aircraft.

SUMMARY

The variable-geometry nature of the convergent-divergent nozzles used on most supersonic aircraft allows them to change their size and flow characteristics in order to optimize thrust generation, i.e. the throat area (A8) and exit area (A9) are adjusted to maximize thrust in high-speed cruise flight. In the invention disclosed herein, the pre-existing nozzle actuators are used to increase shear layer mixing by rapidly changing A8 and A9 by small amounts such as, for example, a few square inches. As A8 and A9 oscillate about a set point, the jet shear layer responds with a corresponding increase in mixing with resulting lower far-field noise levels.

In one embodiment, a jet engine adapted for reducing far-field noise levels is disclosed. The jet engine includes a plurality of flap assemblies disposed around a perimeter of an exhaust port of the jet engine, wherein each flap assembly is movable between a first position and a second position, and a plurality of actuators that are respectively coupled to the plurality of flap assemblies. Each actuator is configured to selectively move the coupled flap assembly between the first and second positions. The jet engine also includes a controller coupled to each actuator, the controller configured to cause at least one actuator to move the coupled flap assembly between the first and second positions at a determined frequency.

In one embodiment, a method of reducing far field noise levels of a jet engine is disclosed. The method includes the step of moving at least one of a plurality of flap assemblies between a first position and a second position at a determined frequency, the flap assemblies disposed around a perimeter of an exhaust port of the jet engine.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of an exhaust nozzle of a jet engine configured to reduce the far-field noise created by the exhaust.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The method and system disclosed herein are presented in terms of an enclosure of a convergent-divergent nozzle adapted for use with a jet turbine engine of a supersonic aircraft. It will be obvious to those of ordinary skill in the art that this same configuration and method can be utilized in a variety of applications where it is desirable to reduce the noise created by a high-velocity gas flow, particularly where the gas flow is supersonic, overexpanded, or under-expanded. Nothing in this disclosure should be interpreted, unless specifically stated as such, to limit the application of any method or system disclosed herein to an aircraft jet engine.

The system is envisioned to be controlled by a full authority digital engine controller (FADEC), and would be employed primarily during takeoff and landing. In certain embodiments, the disclosed method is implemented entirely in the software of the FADEC and no additional parts or hardware changes are required.

FIG. 1 is a cut-away diagram of an example low-bypass jet engine 10. This example engine 10 has an intake 12, a compression section 14, a combustion section 16, a turbine section 17, and an exhaust 18. In some engines, both the turbine section 17 and the compression section 14 include both low-pressure and high-pressure subsystems.

FIG. 2 depicts an example jet aircraft 20 with a variable geometry exhaust nozzle 22. This example nozzle 22 comprises multiple flap assemblies 24 that together form the final conduit of the exhaust gas from the jet engine (not visible).

Figure 3A:
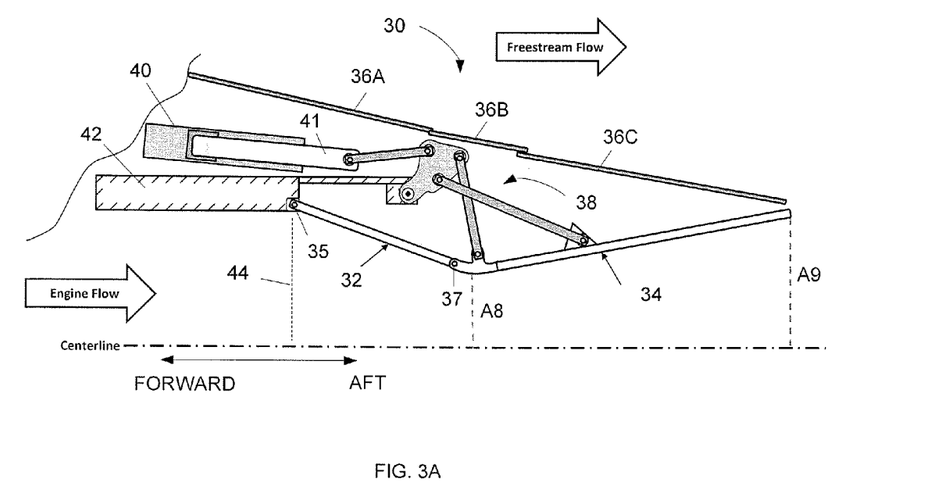
FIGS. 3A and 3B depict a cross-section of a single flap assembly of an example variable geometry exhaust nozzle according to certain aspects of this disclosure.
Figure 3B:
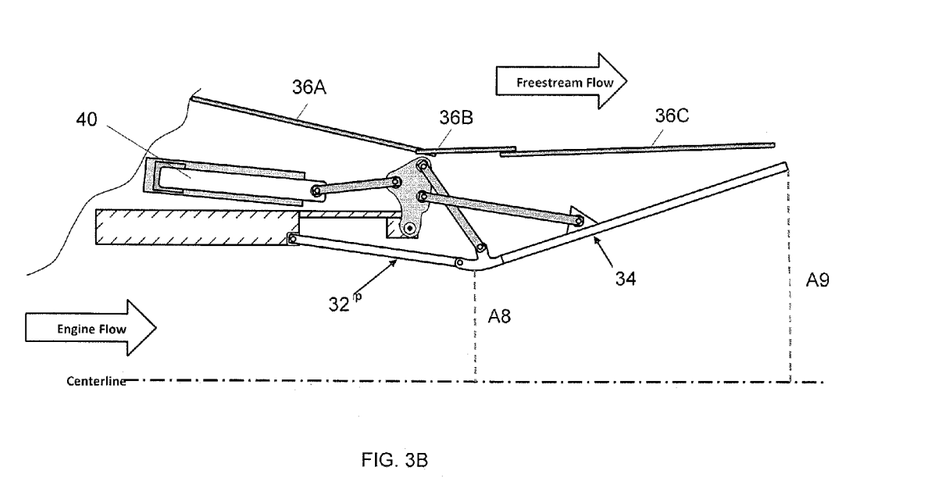

FIGS. 3A and 3B depict a cross-section of a single flap assembly 30 of an example variable geometry exhaust nozzle according to certain aspects of this disclosure. The nozzle, in this example, is axisymmetric about a centerline shown at the bottom of FIG. 3A with multiple flap assemblies 30 disposed around the perimeter of the exhaust port 44. The internal surface of each flap assembly, in this example, is formed by a convergent flap 32 and a divergent flap 34. The convergent flap 32 is hingedly attached at a first end to the airframe 42 at pivot 35. The second end of the convergent flap 32 is hingedly attached to the divergent flap 34. In certain embodiments, a first end of the divergent flap 34 is fixedly attached to the convergent flap 32 and the second end is free. This type of convergent-divergent nozzle, sometimes referred to as a de Laval nozzle, is used on some high-performance jet aircraft to accelerate the hot, pressurized exhaust gas leaving the engine at the exhaust port to supersonic speed.

In this example embodiment of a convergent-divergent nozzle, the shape of the internal surface of flap assembly 30 can be changed by movement of the flaps 32 and 34 about the pivot 35. This is the feature referred to as "variable geometry." In the embodiment of FIG. 3A, divergent flap 34 is hingedly attached to convergent flap 32 at pivot 37. A linkage 38 is attached to the airframe 42 and to both flaps 32 and 34. An actuator 40 is attached at one end to the airframe 42 and at the other end to the linkage 38. As the shaft 41 of actuator 40 extends and retracts, the linkage 38 causes the flaps 32 and 34 to rotate about pivots 35 and 37. In this embodiment, the motion of divergent flap 34 relative to convergent flap 32 is controlled by the design of linkage 38, such that flaps 32 and 34 move together with different amounts of angular motion. External flaps 36A, 36B, and 36C cover the actuator 40, linkage 38, and other structure in this area and provide a smooth external surface of the aircraft to, for example, minimize drag from the freestream air passing the aircraft.

In a convergent-divergent nozzle, the area circumscribed by the second end of the plurality of convergent flaps forms a throat A8 and the area circumscribed by the free end of the plurality of divergent flaps forms an exit A9. In this embodiment, the relationship between the position of convergent flap 32 and divergent flap 34, and therefore the areas of A8 and A9, is controlled by the linkage 38 and not adjustable in flight. Motion of actuator 40 will therefore synchronously vary both A8 and A9 in a relationship determined by the linkage 38.

FIG. 3A illustrates an example configuration of variable geometry nozzle 30 such as might be appropriate to create the maximum power available from this engine running without an afterburner. FIG. 3B illustrates an example configuration of the variable geometry nozzle 30 such as might be appropriate for this engine when the afterburner is activated. Actuator 40 has been retracted, thereby rotating both the convergent flap 32 outward, i.e. away from the centerline of FIG. 3A, thereby increasing the area of the throat A8 and also rotating the divergent flap 34 outward, thereby increasing the area of the exit A9. The external flaps 36A, 36B, and 36C have moved to accommodate this repositioning of the flaps 32 and 34. Motion of actuator 40 is controlled by an aircraft controller such as the FADEC.

Figure 4A:
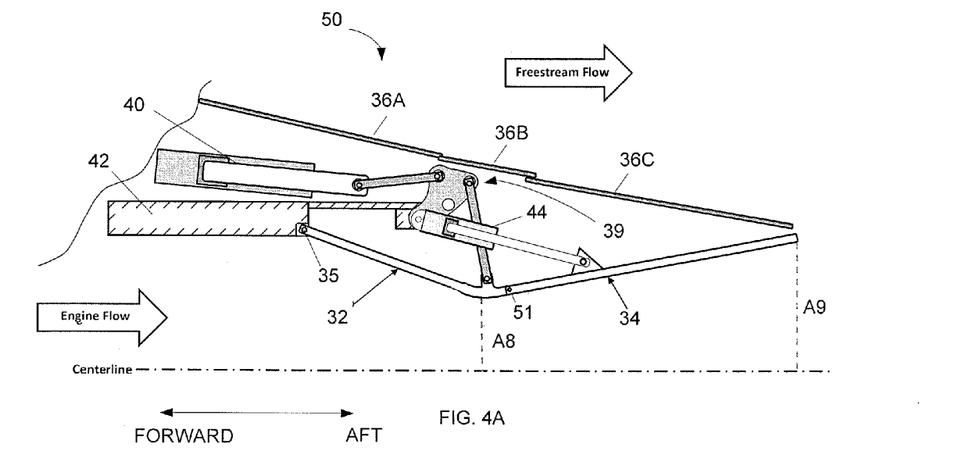
FIGS. 4A and 4B depict a cross-section of a portion of another example embodiment of a variable geometry exhaust nozzle according to certain aspects of this disclosure.
Figure 4B:
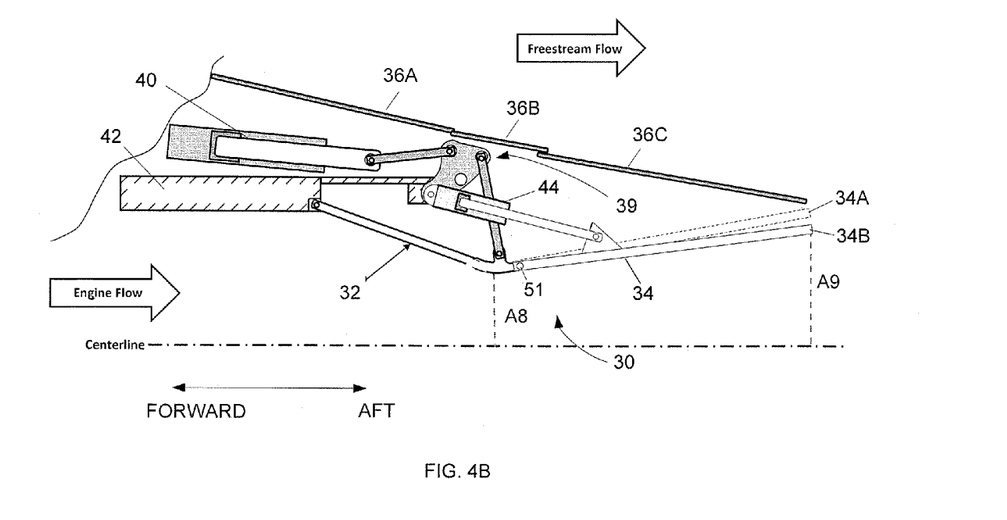

FIGS. 4A and 4B depict a cross-section of a portion of another example embodiment of a variable geometry exhaust nozzle 50 according to certain aspects of this disclosure. The flaps 32 and 34 of nozzle 50 are the same size and flap 32 is connected to the airframe as in the nozzle 30 of FIGS. 3A and 3B. In nozzle 50, however, actuator 40 is connected through linkage 39 only to the convergent flap 32. The divergent flap 34 is hingedly connected to convergent flap 32 at pivot 51, and a second actuator 44 is coupled between the airframe 42 and the divergent flap 34. In this embodiment, the position of divergent flap 34 can be adjusted relative to the convergent flap 32 while in flight through motion of actuator 44. By appropriate motions of actuators 40 and 44, both controlled by an external controller (not shown), such as the FADEC, the area of the throat A8 can be varied while the area of the exit A9 is held constant. Similarly, the area of throat A8 can be held constant while the area of exit A9 is varied. Furthermore, the areas of A8 and A9 can be varied simultaneously, either with the same or different amount of variation in area.

FIG. 4B illustrates an example configuration of nozzle 50 where the position of divergent flap 34 is varied while the position of convergent flap 32 is held constant. The dashed line of position 34A indicates a first position of flap 34 that is the same as shown in FIG. 4A. Position 34B indicates a second position of flap 34, where motion of actuator 44 has caused flap 34 to rotate about pivot 51.

Jet noise reduction can be achieved via enhancement of mixing in the jet shear layer. This mixing increases the noise in the near-field but also increases the frequency of the radiated noise. Since the atmosphere absorbs high-frequency sound much more rapidly than low frequencies, the mixing enhancement results in lower noise in the far field. This invention enhances mixing in the shear layer through unsteady actuation of variable geometry nozzles such as the nozzles of FIGS. 3A and 4A. Motion of flap assemblies 30 and 50 will introduce flow velocity variations into the jet flow that may excite instability waves or generate variations in the large-scale structure or fine-scale turbulence. As A8 and A9 oscillate about a set point, the jet shear layer will respond with a corresponding increase in mixing, resulting in lower far-field noise levels.

In certain embodiments of the disclosed invention, the controller causes actuator 44 to move flap 34 of nozzle 50 between the first and second positions at a determined frequency. In certain embodiments, this determined frequency is in the range of 1 Hz to 35 kHz. In certain embodiments, this determined frequency is in the range of 3 Hz to 10 kHz. In certain embodiments, this determined frequency is in the range of 10 Hz to 1 kHz. In certain embodiments, the controller causes a portion of the plurality of flap assemblies 50 that are disposed around the perimeter of the exhaust port to move flap 34 between the first and second position at the determined frequency. In certain embodiments, the portion of the plurality of flaps 50 move synchronously. In certain embodiments, the portion of the plurality of flaps 50 move synchronously but with their motions phase shifted with respect to each other. In certain embodiments, the controller causes all of the plurality of flap assemblies 50 to move between their respective first and second positions at the determined frequency. In certain embodiments, the controller causes a first portion of the plurality of flap assemblies 50 to move between their respective first and second positions at a first determined frequency and a second portion of the plurality of flap assemblies 50 to move between their respective first and second positions at a second determined frequency.

In certain embodiments, flap 32 is held in a constant position, such that the area of throat A8 does not vary, while flap 34 is moved such that the area of exit A9 varies. In certain embodiments, flap 32 is moved such that the area of throat A8 varies and flap 34 is moved such that the area of exit A9 does not vary.

In certain embodiments, the area of at least one of the throat A8 and exit A9 is varied by an amount in the range of 0.01% to 1% of the nominal area. In certain embodiments, the area of at least one of the throat A8 and exit A9 is varied by an amount in the range of 0.05% to 0.5% of the nominal area. In certain embodiments, the area of at least one of the throat A8 and exit A9 is varied by an amount in the range of 0.1% to 0.3% of the nominal area. In certain embodiments, the throat A8 and exit A9 are varied by the same proportional amount. In certain embodiments, the throat A8 and exit A9 are varied by the same absolute amount. In certain embodiments, the area of at least one of the throat A8 and exit A9 is varied by 2-5 square inches.

In certain embodiments of the disclosed invention, the controller causes actuator 40 to move flap 32 between the a first and a second position at a determined frequency and actuator 44 to move flap 34 of nozzle 50 between a first and a second position at the determined frequency. In certain embodiments, this determined frequency is in the range of 1 Hz to 35 kHz. In certain embodiments, this determined frequency is in the range of 3 Hz to 10 kHz. In certain embodiments, this determined frequency is in the range of 10 Hz to 1 kHz. In certain embodiments, the controller causes a portion of the plurality of flap assemblies 50 that are disposed around the perimeter of the exhaust port to move flaps 32 and 34 between their respective first and second positions at the determined frequency. In certain embodiments, the portion of the plurality of flaps 50 move flaps 32 and 34 synchronously. In certain embodiments, the portion of the plurality of flaps 50 move flaps 32 and 34 synchronously but with the motions of at least one of flap 32 and 34 phase shifted with respect to the other of flap 32 and 34, respectively. In certain embodiments, the controller causes all of the plurality of flap assemblies 50 to move flaps 32 and 34 between their respective first and second positions at the determined frequency. In certain embodiments, the controller causes a first portion of the plurality of flap assemblies 50 to move flaps 32 and 34 between their respective first and second positions at a first determined frequency and a second portion of the plurality of flap assemblies 50 to move flaps 32 and 34 between their respective first and second positions at a second determined frequency.

In certain embodiments of the configuration of FIG. 4B, each of flaps 32 and 34 have first and second positions, such that the flap assembly 50 has a first position wherein flaps 32 and 34 are in their respective first positions, and flap assembly 50 has a second position wherein flaps 32 and 34 are in their respective second positions.

In certain embodiments of the disclosed invention, as shown in FIGS. 3A and 3B, the controller causes actuator 40 to move both flaps 32 and 34 of nozzle 30 between a the first and a second position at a determined frequency, wherein flaps 32 and 34 move synchronously such that the flap assembly has a first position and second position. In certain embodiments, this determined frequency is in the range of 1 Hz to 35 kHz. In certain embodiments, this determined frequency is in the range of 3 Hz to 10 kHz. In certain embodiments, this determined frequency is in the range of 10 Hz to 1 kHz. In certain embodiments, the controller causes a portion of the plurality of flap assemblies 30 that are disposed around the perimeter of the exhaust port to move between their respective first and second positions at the determined frequency. In certain embodiments, the portion of the plurality of flaps 30 move synchronously. In certain embodiments, the portion of the plurality of flaps 30 move synchronously but with their motions phase shifted with respect to each other. In certain embodiments, the controller causes all of the plurality of flap assemblies 30 to move between their respective first and second positions at the determined frequency. In certain embodiments, the controller causes a first portion of the plurality of flap assemblies 30 to move between their respective first and second positions at a first determined frequency and a second portion of the plurality of flap assemblies 30 to move between their respective first and second positions at a second determined frequency.

Figure 5A:
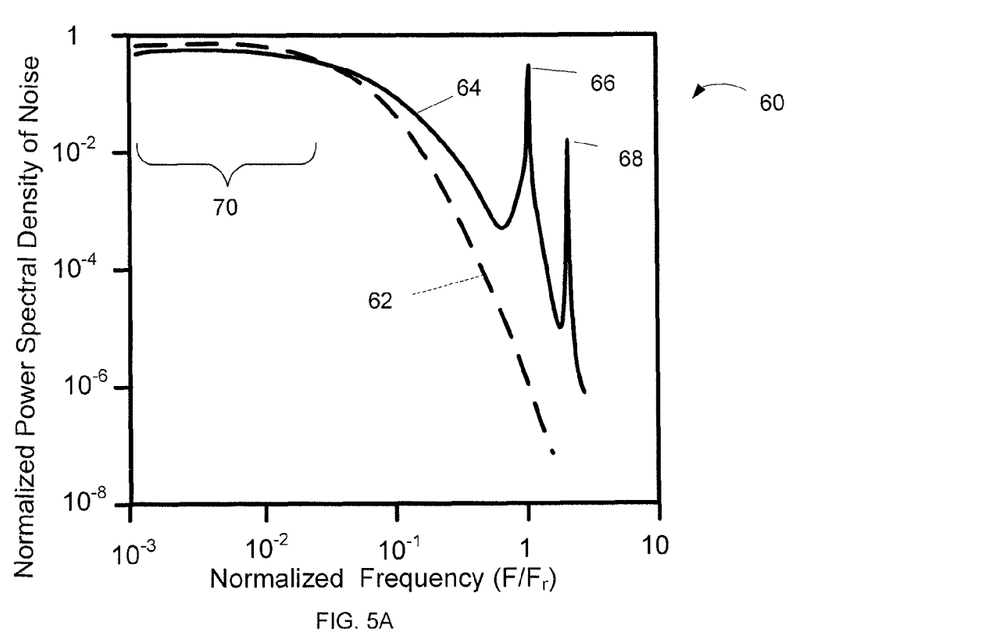
FIGS. 5A and 5B illustrate example near-field and far-field power spectral densities of the noise from the exhaust of a jet engine according to certain aspects of this disclosure.
Figure 5B:
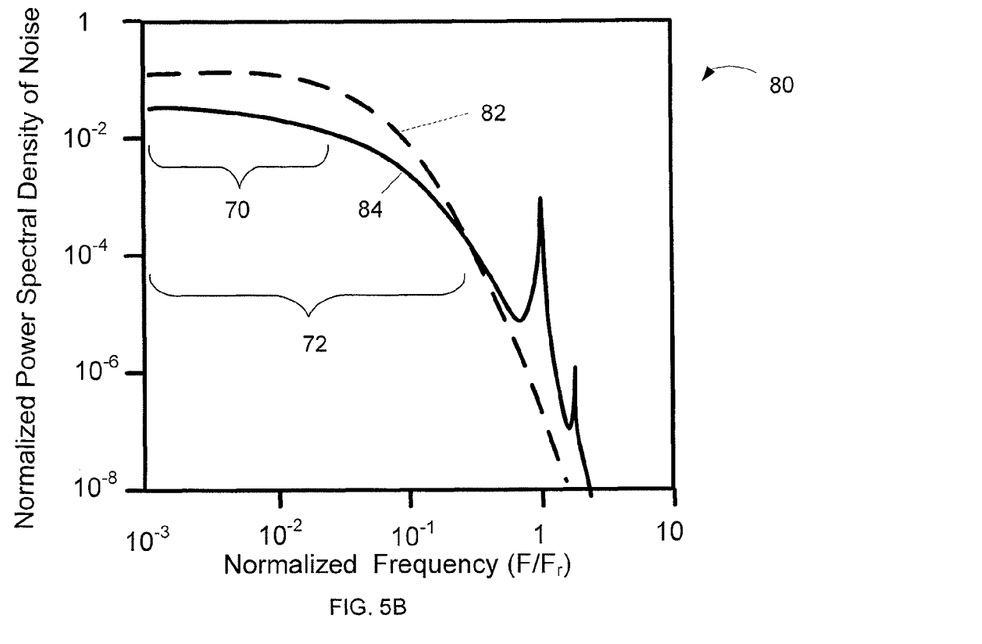

FIGS. 5A and 5B illustrate example near-field and far-field power spectral densities 60 and 80 of the noise from the exhaust of a jet engine according to certain aspects of this disclosure. FIGS. 5A and 5B are generally illustrative of the benefits expected of the disclosed invention but are not to scale and are not representative of a particular embodiment of the invention.

FIG. 5A is an illustrative plot 60 of the near-field noise produced by an example jet engine such as engine 10 of FIG. 1. The noise is presented on a normalized scale of the power spectral density (PSD) of the noise created by the engine exhaust vs. normalized frequency. The PSD has been normalized to the maximum noise amplitude and the frequency normalized to the determined frequency disclosed herein. Line 62 indicates the noise profile of the engine without implementation of the disclosed invention.

Line 64 indicates an example noise profile when the disclosed invention is utilized. Line 64 is slightly lower than the baseline 62 over a portion 70 of the frequency spectrum. Above this portion, the noise level 64 is higher than the baseline 62, with a peak 66 at the determined frequency (i.e. normalized frequency=1) where the motion of the flaps has increased the magnitude of pressure variations (i.e. the magnitude of the sound) at the determined frequency. Line 64 also shows a harmonic peak 68 at the first multiple of the determined frequency (i.e. normalized frequency=2) as some resonant content is expected.

The plot 80 of FIG. 5B is an illustrative plot of far-field noise due to the same engine. Noise is attenuated by the atmosphere based on both distance and frequency, wherein the higher frequencies attenuate faster than lower frequencies as the distance increases. At the example distance of plot 80, the baseline noise spectrum 82 has been reduced by a factor of approximately 2-4× compared the corresponding baseline near-field spectrum 62 of plot 60. The noise level line 84 indicates how the noise levels in the lower frequency range 72, including portion 70 from FIG. 5A, are lower with the use of the disclosed invention. Above range 72, the noise levels of line 84 may still be higher than the baseline levels of line 82, but these levels are an order of magnitude or more lower than the low frequency noise levels and are decreasing more rapidly as the propagation distance increases.

As the oscillation of the flap assemblies between two positions may reduce the available thrust of the engine or increase the drag on the aircraft, it is expected that this noise-reduction system will be used only during noise-critical periods of operation, such as take-off or landing. One of the advantages of this invention is that it utilizes the same actuators as are presently used to adjust the configuration of variable-geometry nozzles on jet aircraft. Implementation of this invention, therefore, may not require modifications to the hardware of the aircraft nor add weight or complexity to the aircraft.

The concepts disclosed herein provide a system and method for reducing the noise of a supersonic jet engine in the far-field. A jet engine adapted for reducing far-field noise levels will have a variable-geometry nozzle that includes a plurality of flap assemblies around the exhaust port of the engine, wherein the flap assemblies can be moved between first and second positions, thereby varying the areas of the throat and exit of the nozzle at a determined frequency. This motion is caused by motion of the actuators that are used to control the geometry of the nozzle. The motion of the actuators is caused by commands received by the actuators from a controller.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A jet engine adapted for reducing far-field noise levels, the jet engine comprising:

a plurality of flap assemblies disposed around a perimeter of an exhaust port of the jet engine, each flap assembly movable between a first position and a second position, each flap assembly comprising a convergent flap having first and second ends and a divergent flap having first and second ends, the first end of the convergent flap being rotatably coupled to an airframe, the first end of the divergent flap being rotatably coupled to the second end of the convergent flap, an area circumscribed by the second ends of the plurality of convergent flaps forming a throat, and an area circumscribed by the second ends of the plurality of divergent flaps forming an exit;

a plurality of convergent actuators respectively coupled to the plurality of convergent flaps;

a plurality of divergent actuators coupled to the plurality of divergent flaps; and a controller operably coupled to each actuator, wherein the controller is configured to cause at least one actuator to move the coupled flap assembly between the first and second positions at a determined frequency, and wherein the controller is configured to cause the plurality of flap assemblies to move so as to vary the area of at least one of the throat and the exit, and wherein the controller is configured to vary the area of the throat by a first amount and the area of the exit by a second amount.

2. The jet engine of claim 1, wherein the controller is further configured to synchronously move at least 30% of the plurality of flap assemblies between the first and second positions of each flap assembly.

3. The jet engine of claim 1, wherein the controller is further configured to synchronously move all of the plurality of flap assemblies between the first and second positions of each flap assembly.

4. The jet engine of claim 1, wherein the determined frequency is in the range of 1 Hz-35 kHz.

5. The jet engine of claim 4, wherein the determined frequency is in the range of 3 Hz-10 kHz.

6. The jet engine of claim 5, wherein the determined frequency is in the range of 10 Hz-1 kHz.

7. The jet engine of claim 1, wherein one of the first and second amounts is zero.

8. The jet engine of claim 1, wherein the controller is configured to vary the area of the at least one of the throat and exit by 0.01%-1.0% of the nominal area.

9. The jet engine of claim 8, wherein the controller is configured to vary the area of the at least one of the throat and exit by 0.02%-0.5% of the nominal area.

10. The jet engine of claim 9, wherein the controller is configured to vary the area of the at least one of the throat and exit by 0.10%-0.3% of the nominal area.

11. The jet engine of claim 1, wherein:

each divergent flap is fixedly coupled to a respective convergent flap; and the controller is further configured to cause the plurality of flap assemblies to move so as to vary the areas of both the throat and exit.

12. The jet engine of claim 1, wherein the plurality of convergent actuators and the plurality of divergent actuators are respectively coupled to the plurality of flap assemblies at one or more locations between divergent endpoints of respective first and second flaps, and wherein each respective actuator is configured to selectively move a coupled flap assembly between the first and second positions by operating on the coupled flap assembly at one or more locations between divergent endpoints of a corresponding first flap and a corresponding second flap.

13. The jet engine of claim 12, wherein each flap assembly is coupled to a corresponding actuator by a linkage having a plurality of pivot points, and wherein actuation of the linkage by the plurality of convergent actuators and the plurality of divergent actuators is operable to cause the flap assembly to rotate about the plurality of pivot points.

* * * * *